US012804216B2

(12) United States Patent
Devir et al.

(10) Patent No.: US 12,804,216 B2
(45) Date of Patent: Nov. 17, 2026

(54) TARGETED CONTENT FOR WEAKLY CONNECTED DEVICES

(71) Applicant: Synamedia Limited, Staines upon Thames (GB)

(72) Inventors: Michal Irit Devir, Haifa (IL); Avi Fruchter, Neve Daniel (IL)

(73) Assignee: Synamedia Limited, Maidehead (GB)

( * ) Notice: Subject to any disclaimer, the term of this patent is extended or adjusted under 35 U.S.C. 154(b) by 394 days.

(21) Appl. No.: 18/093,286

(22) Filed: Jan. 4, 2023

(65) Prior Publication Data

US 2024/0223833 A1 Jul. 4, 2024

(51) Int. Cl.

| | |
|---|---|
| ***H04N 21/2668*** | (2011.01) |
| ***G06Q 30/0251*** | (2023.01) |
| ***H04N 21/24*** | (2011.01) |
| ***H04N 21/475*** | (2011.01) |

(52) U.S. Cl.

CPC ..... *H04N 21/2668* (2013.01); *G06Q 30/0254* (2013.01); *G06Q 30/0255* (2013.01); *H04N 21/2407* (2013.01); *H04N 21/4755* (2013.01)

(58) Field of Classification Search

CPC ........... H04N 21/2668; H04N 21/2407; H04N 21/4755; H04N 21/44016; H04N 21/432; H04N 21/4325; H04N 21/44; H04N 21/44008; H04N 21/458; H04N 21/234; H04N 21/23424; G06Q 30/0254; G06Q 30/0255

USPC ........................................................... 725/14

See application file for complete search history.

(56) References Cited

U.S. PATENT DOCUMENTS 8,924,993 B1 * 12/2014 Niebles Duque ...... G06V 20/41 725/9
2003/0097657 A1 * 5/2003 Zhou .................... H04N 21/454 725/38
2003/0233241 A1 * 12/2003 Marsh ..................... G06F 16/48 707/E17.009

(Continued)

FOREIGN PATENT DOCUMENTS

JP 2017102948 A 6/2017

OTHER PUBLICATIONS

Extended European Search Report dated Mar. 21, 2024, European Application No. 23215811.3, pp. 1-14.

*Primary Examiner* — Alfonso Castro
(74) *Attorney, Agent, or Firm* — Fernando & Partners, LLP

(57) ABSTRACT

Techniques for providing and selecting targeted content as well as measuring targeted content selection at weakly connected devices are described herein. In some embodiments, a server tags media content items with attribute(s) and content attribute (CA) scores before transmitting the tagged media content items to a weakly connected device, where the CA scores are used to locally determine user attribute (UA) scores representing levels of interest for the attribute(s) based on viewed content. Once receiving a set of targeted content items (e.g., advertisements) having attributes from the server, the weakly connected device selects an advertisement based at least in part on the attributes and the UA scores. In some embodiments, the server obtains UA scores from the weakly connected devices and in conjunction with panel data and data from fully connected devices, measures times an advertisement being viewed at the weakly connected devices by a segment of audience.

20 Claims, 9 Drawing Sheets

(56) References Cited

U.S. PATENT DOCUMENTS

| | | | | |
|---|---|---|---|---|
| 2007/0011747 | A1* | 1/2007 | Whitfield, Jr. ........ | G06F 3/0604 348/E7.063 |
| 2014/0358676 | A1 | 12/2014 | Srivastava et al. | |
| 2017/0091786 | A1* | 3/2017 | Sheppard ........... | G06Q 30/0201 |
| 2018/0293313 | A1 | 10/2018 | Hauptmann et al. | |
| 2019/0327522 | A1 | 10/2019 | Nelson et al. | |

* cited by examiner

600

TARGETED CONTENT FOR WEAKLY CONNECTED DEVICES

TECHNICAL FIELD

The present disclosure relates generally to media content delivery and, more specifically, to delivering and tracking targeted content for weakly connected devices.

BACKGROUND

Tailoring media content in a system according to user preference is a desirable feature. Through targeted advertisements, a headend delivers targeted content such as recommended videos and/or advertisements to users in which the users are most likely interested. 2-way client devices (also referred to as fully connected devices) typically receive media content from the headend and report user actions (i.e., impressions) back to the headend. As such, there are many ways to calculate in the backend what content is suitable for users at 2-way client devices based on the user information received from the 2-way client devices. In contrast, for users connecting through weakly connected devices, e.g., 1-way client devices or 2-way client devices that do not share or share limited client data with the backend, it is difficult to target content. For various reasons, e.g., 1-way connectivity, privacy settings, and/or guest or trial usage, etc., weakly connected devices typically receive content from the headend but do not report user action data or report limited user action and viewing history data to the headend. Without such client data, it is difficult for operators to associate area-of-interest attributes to users, thus significantly limiting the value of addressable advertisements.

Currently, targeted advertisements for weakly connected devices are limited to a small set of predefined user attributes (e.g., location, age, income, etc.), which broadcasters know how to assign to each household and/or a segment (i.e., a set of users or viewers with certain attribute(s)) in a given slot. For example, the broadcaster knows the end user's geolocation and/or income and sets the proper value corresponding to the location and/or income attribute for targeted content. The small set of predefined attributes gives the advertisers some capabilities to target advertisements based on segments and provides the advertisers with simple deterministic amounts of advertisements viewed, e.g., when correlating the known segments with panel data.

Panel data are often used by business entities to predict consumer trends for the entire population based on data collected from samples of users. For example, one can use the panel data such as the number of devices tuned to a channel at a given time for estimating the actual number of impressions for each advertisement. In another example, upon identifying segment A corresponding to (North, 24-35) and segment B corresponding to (South, 24-35), a broadcaster can air two different advertisements, e.g., advertisement X for segment A and advertisement Y for segment B. Based on the small set of predefined user attributes, the broadcaster knows the number of households in each segment for the general population. Together with the panel data, the broadcaster can calculate the number of impressions X and Y have statistically been seen.

Similar to the small set of predefined attributes, the panel data also have a limited number of attributes. For example, the panel data provide information related to the number of views for each channel at a given time or the number of views for each event but does not provide statistical data of views for each segment. As such, broadcasters cannot dynamically estimate the number of times each advertisement has been viewed by various segments because previously existing systems cannot derive dynamic segment data based on viewing patterns from the panel data and/or the small set of predefined attributes.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
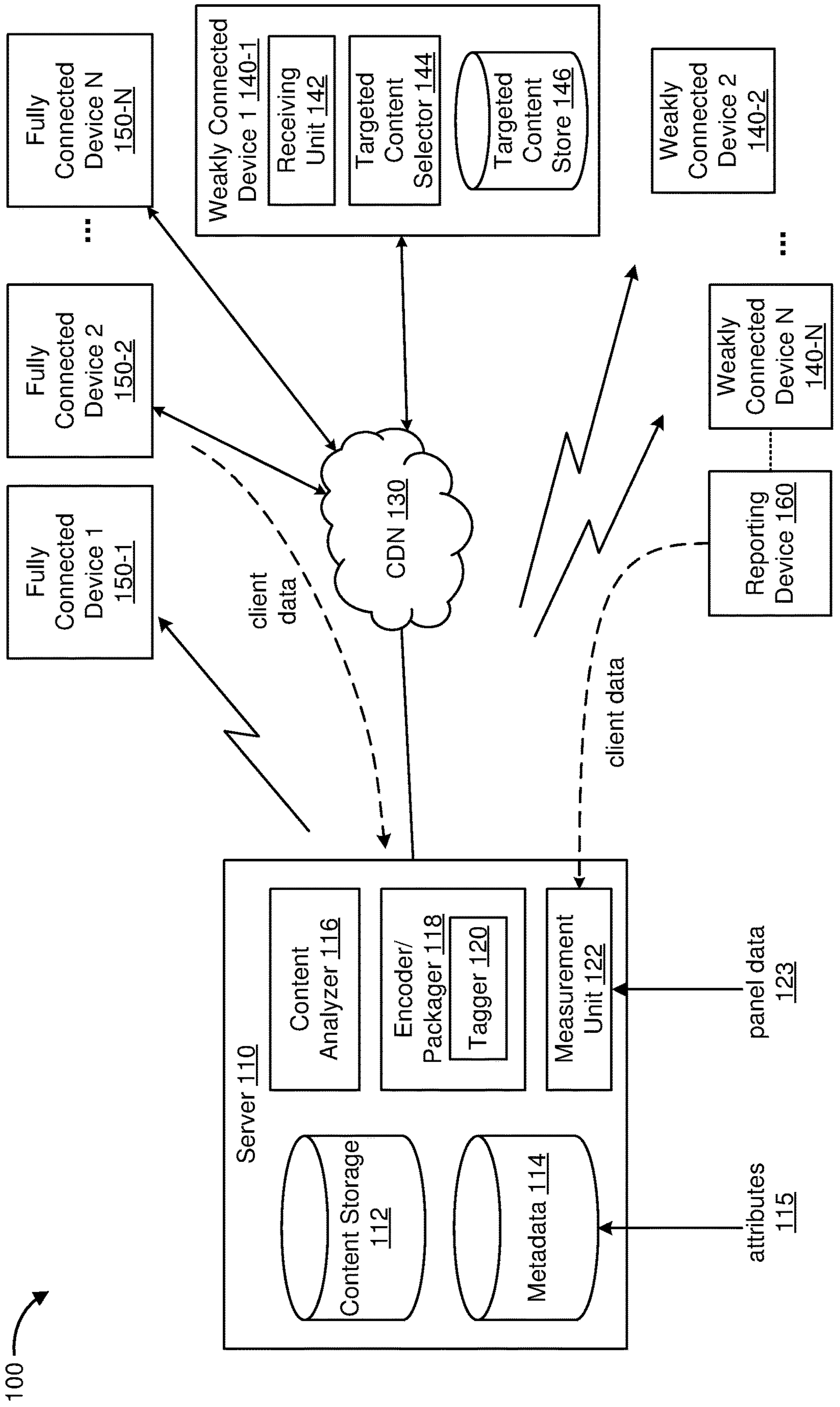
FIG. 1 is a block diagram of an exemplary multimedia content delivery system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Targeted content delivery methods, devices, and systems described herein address the aforementioned limited availability of attributes for weakly connected devices by creating dynamic and personal area-of-interest attributes based on viewing patterns. In some embodiments, a learning mechanism on the server side associates content with attributes, e.g., generating metadata and/or tagging assets with associated attributes. On the client side, client engines track viewing patterns; and based on the metadata from the server side and the local viewing patterns, the client engines dynamically select the most appropriate advertisements associated with the attributes. In some embodiments, an engine on the server side mimics or emulates the client engines and combines the client data from weakly connected devices with available data (e.g., the panel data and/or data from fully connected devices) to predict or report the estimated number of times the advertisements have been viewed at weakly connected devices.

In accordance with various embodiments, a content tagging method is performed at a headend that includes one or more processors and a non-transitory memory. The method includes tagging media content items with one or more attributes and corresponding content attribute scores. The method further includes transmitting the tagged media content items to a weakly connected device, where the one or more content attribute scores are used by the weakly connected devices to determine levels of interest for the one or more attributes based on viewed content at the weakly connected device. The method also includes transmitting to the weakly connected device a set of targeted content items having a set of attributes. The method additionally includes causing the weakly connected device to select a targeted content item from the set of targeted content items based at least in part on the set of attributes and the levels of interest.

In accordance with various embodiments, a targeted content selection method is performed at a client device that includes a processor and a non-transitory memory. The method includes receiving from a server, media content items tagged with content attribute scores associated with attributes generated by the server based on similarities between the attributes and the media content items. The method also includes calculating, for viewed content items at the client device, user attribute scores for the attributes based at least in part on the content attribute scores, where a respective user attribute score indicates a level of interest in a respective attribute at the client device. The method additionally includes receiving, from the server, targeted content items tagged with a set of attribute identifiers. The method further includes selecting a targeted content item from the targeted content items based at least in part on the user attribute scores and the set of attribute identifiers.

EXAMPLE EMBODIMENTS

Methods, devices, and systems in accordance with various embodiments described herein expand panel data or other predefined attributes and generate statistical data for dynamic segments. In some embodiments, a broadcaster defines attributes so that clients at weakly connected devices can select one or more attributes based on local viewing patterns, even though the broadcaster is unaware of or has limited information about the viewing patterns on the weakly connected devices. In some embodiments, the server broadcasts additional area-of-interest attributes with content, and the attributes are used by the clients to build profiles of interest. Further, in some embodiments, the additional attributes allow the clients to dynamically update weights assigned to the area-of-interest attributes. In such embodiments, the new area-of-interest attributes created on the client side allow clients to process viewing history, dynamically update the area-of-interest attributes, and select the most relevant advertisements. Accordingly, through the weights and attributes established on the server side, broadcasters can control client engines and the selection of relevant advertisements for users at weakly connected devices. Moreover, in some embodiments, by analyzing the similarities between the attributes and viewed content at weakly connected devices, the methods, devices, and systems described herein can generate dynamic measurements of the number of impressions at the weakly connected devices.

Reference is now made to FIG. 1, which is a block diagram of an exemplary multimedia content delivery system 100 in accordance with some embodiments. In some embodiments, the multimedia content delivery system 100 includes a server 110 (e.g., a headend), a content delivery network (CDN) 130, and a plurality of client devices, including weakly connected devices 140 (e.g., weakly connected device 1 140-1, weakly connected device 2 140-2, . . . , weakly connected device N 140-N) and fully connected devices 150 (e.g., fully connected device 1 150-1, fully connected device 2 150-2, . . . , fully connected device N 150-N). Each of the client devices 140 and 150 can be a TV, a set-top-box, a mobile device, a console, and/or any computing device with a processor and a non-transitory memory. In some embodiments, the server 110 includes a content storage 112 for storing multimedia content, e.g., TV programs and/or targeted media content such as advertisements. In some embodiments, the server 110 also includes a metadata storage 114 for storing metadata associated with the media content and/or users, e.g., metadata for users, programs, and/or advertisements.

In FIG. 1, although a single server 110, a single content storage 112, a single metadata storage 114, and a single CDN 130 are illustrated, the system 100 can include one or more servers 110 hosting one or more content storage units 112 and/or one or more metadata storage units 114, as well as include zero, one, or more CDNs 130 for scalability. For the sake of simplicity, the subject matter will be described hereinafter for the most part with reference to a single server 110, a single content storage 112, a single metadata storage 114, and a single CDN 130. Further, as shown in FIG. 1, in some embodiments, the data prepared by the server 110 are transmitted via broadcasting by broadcasters (not shown), e.g., via cable or satellite. As such, any of the weakly connected devices 140 and/or any of the fully connected devices 150 can receive the data from the server 110 via broadcasting and/or via the CDN 130.

In some embodiments, the metadata associated with a media content item include a synopsis, a trailer, image(s), etc. In some embodiments, the metadata about a targeted content item include key words, free text, and/or images taken from targeted content item(s), etc. In some embodiments, advertisers define and provide attributes 115. In some embodiments, attributes provided by advertisers define segments of a targeted audience. For example, an attribute "travel" defines users that like to travel and are likely interested in viewing advertisements related to booking trips. A media content item (e.g., a TV program) or a targeted content item (e.g., an advertisement) can be associated with different attributes and different segments. In other words, one targeted content item can be associated with multiple attributes and targeting multiple segments. Conversely, one segment can be targeted by more than one advertisement. As will be described in further detail below, the server 110 analyzes similarities among the media content items, the targeted content items, and the attributes to derive content attribute scores representing the associations among them. Further, in some embodiments, the server 110 stores the content attribute scores in the metadata storage 114 along with the attributes.

In some embodiments, the server 110 includes a content analyzer 116 that uses the metadata in the metadata storage unit 114 as well as the multimedia content items stored in the content storage unit 112 to prepare for targeted content processing and measurement of the number of views of the targeted content. In some embodiments, the server 110 also includes an encoder and packager 118 for encoding multi-media content from the content storage 112 (e.g., live or video-on-demand (VOD) content) and packaging the encoded content to a suitable format for streaming to the client devices 140 and 150. In some embodiments, attributes, e.g., at least a subset of the metadata from the metadata storage 114, are encoded and/or packaged by the encoder and packager 118 so that the attributes can be transmitted as well with the media content items and/or the targeted content items to the client devices 140 and 150.

As used herein, "multimedia content" (also referred to hereinafter as "media content", "content", "media asset", "asset", or "content items") is provided by the server 110 and received by the client devices 140 and 150 and can include any multimedia data, such as visual data, audio data, and/or text, etc. Further, the content prepared by the server 110 and received by the client devices 140 and 150 can have a variety of encoding and/or packaging formats. For example, the encoder and packager 118 can encode the content from the content storage 112 into any suitable format, including, but not limited to, advanced video encoding (AVC), versatile video coding (VVC), high efficiency video coding (HEVC), AOMedia video 1 (AV1), VP9, MPEG-2, MPEG-4, MP3, AC-3, etc. In another example, the encoder and packager 118 can package the encoded content according to Dynamic Adaptive Streaming over HTTP (DASH), HTTP Live Streaming (HLS), Smooth Streaming, or HTTP Dynamic Streaming (HDS) format and construct manifest in accordance with HLS or DASH.

Also as used herein, "targeted content" (also referred to hereinafter as "a targeted content item") is one type of media content created and tailored for the targeted audience with the goal of driving a specific response from the targeted audience. Advertisements are one type of targeted content. When an advertisement is shown to a group of users that is identified as the targeted audience of the advertisement, the group of users would most likely find the advertisement appealing and the advertisement is likely to prompt the group of users to take actions such as making a purchase, completing a subscription, and/or making the users aware of a brand. In order to select the most relevant targeted content items for the targeted audience, media content items viewed by the targeted audience are analyzed. As such, "media content items" as used herein refers to content such as TV programs and/or advertisements that are analyzed by the server 110 for deriving the associations between the TV programs and certain attributes that define a segment of the targeted audience, e.g., analyzing the types of movies and/or advertisements viewed by a user to derive the user interest in attributes such as "travel" or "cooking". Accordingly, as used herein, "a media content item" can be a targeted content item or a non-targeted content item.

In some embodiments, the encoder and packager 118 includes a tagger 120 that tags the targeted content items and the media content items with content attribute scores determined by the content analyzer 116. In some embodiments, the content analyzer 116 identifies similarities among the attributes, the media content items, and the targeted content, and generates content attribute (CA) scores. For example, a movie, as a media content item, showing multiple global locations can result in meaningful values for an attribute "travel", thus the CA score associated with the attribute "travel" and the video is high. In another example, by analyzing the metadata associated with a global travel booking advertisement video, e.g., the keyword in the defined attributes 115 provided by an advertiser, the content analyzer 116 determines a high CA score associated with the attribute "travel" and the global travel booking advertisement video.

In some embodiments, the content analyzer 116 and/or the tagger 120 associate the content attribute scores for a subset of the content items. In some embodiments, the content analyzer 116 and/or the tagger 120 specify for a content item whether it would be part of the content attribute score calculation. For example, for some content items that the server 110 determines being in one or more predefined categories, e.g., mainstream content, the content analyzer 116 and/or the tagger 120 forgo calculating and/or tagging such content items, since they do not contribute to analyzing user interests. For example, news may show content from a superhero movie, sports, and/or travel destinations, etc. that are associated with many different attributes. As such, a user watching the news is not an indication of the user being interested in attributes such as superhero, sports, and/or travel, etc.

Still referring to FIG. 1, in some embodiments, the server 110 also includes a measurement unit 122 for estimating the proportion(s) of population viewing the targeted content item(s) at the weakly connected devices 150. As will be described in further detail below, the tagging by the tagger 120 enables the client devices 140 and 150 to determine relevant targeted content items for the clients and allows the measurement unit 122 to perform the estimation for purposes such as reporting and/or projection.

On the receiving end, in some embodiments, the exemplary weakly connected device 1 140-1 includes a receiving unit 142 for receiving tagged media content from the server 110 (e.g., via the CDN 130 or via broadcasting), a targeted content selector 144 for selecting targeted content (e.g., based on the attributes, the content attribute scores, and/or viewed content items at the client device, etc.), and a targeted content store 146 for storing targeted content in preparation for playing the selected targeted content. The weakly connected devices 140, as described above, often do not share or share limited client data with the server 110 due to 1-way connectivity limitation, privacy settings, and/or guest or trial usages, etc. In some embodiments, at least some of the weakly connected devices 140 report client data to the server 110 when another system(s) and/or device(s) facilitate the transmission of the information to the server 110. For example, another computing device 160 as an independent source, e.g., a mobile device coupled with the exemplary weakly connected device N 140-N, can act as a reporting device to scan a QR code provided by the respective weakly connected device 140, e.g., the QR code representing client data such as one or more user attribute scores, and report the client data at the weakly connected device N 140-N to the measurement unit 122. In another example, the reporting device 160 can be a part of an audience measurement system (AMS), which obtains client data from the exemplary weakly connected device N 140-N via samples, surveys, audience engagement tools, video analytics, audience metering techniques, etc., and passes the client data to the measurement unit 122. The measurement unit 122 then uses such client data for estimating the proportion in the population of attributes that define segments in accordance with some embodiments. The measurement unit 122 thus can be an engine on the server side to mimic or emulate the client engines to predict or report the estimated number of times targeted content has been viewed at weakly connected devices 140.

In addition to receiving the client data from some of the weakly connected devices 140, as shown in FIG. 1, the measurement unit 122 also receives client data from sources such as panel data 123 and the fully connected devices 150 in accordance with various embodiments. Though not shown in FIG. 1, in some embodiments, broadcasters provide another source of client data. For example, one broadcaster broadcasting to the fully connected devices 150 in one geographical region can share the client data received from the fully connected devices 150 in the region with other service providers. As such, the broadcaster can be a third party for providing regional client data.

As described above, business entities often use the panel data 123 to predict consumer trends for the entire population based on data collected from samples of users. Also as described above, the panel data 123 have limited number of attributes such as the information related to the number of views for each channel at a given time or the number of views for each event. For example, the broadcaster at the headend knows the number of people associated with segment A and the number of people associated with segment B. From these numbers, the broadcaster knows the proportion of segment A and the proportion of segment B in the general population. As such, using the panel data, the broadcaster can calculate the number of impressions based on the number of views and the proportion, e.g., number of impressions=number of views*proportion.

The limitations of the existing panel data are problematic since the assumption is that the same proportion is valid for each channel and time. Further, with the limited number of attributes, e.g., geolocations and/or income, the current panel data are deterministic by the limited set of attributes and are not dynamic by viewing patterns. To address the aforementioned limitations in the existing panel data, in some embodiments, the measurement unit 122 extends the panel data 123 to generate dynamic segment data, e.g., generating the population numbers for each attribute. Additionally as described above, the fully connected devices 150 utilize the 2-way connections to receive media content from the server 110 and report user actions to the server 110. In some embodiments, based on the user data from the fully connected devices 150 and the approximation that reflects the statistical data for the general population, the measurement unit 122 estimates the proportions in the population of attributes that define segments viewing each target media content item at the weakly connected devices 140. Various embodiments of measuring the number of impressions are described in further detail below with reference to FIG. 5.

It should be noted that one or more components and/or functions of the server 110 and/or the weakly connected device 140 may be distributed and/or re-arranged. For example, each of the content storage 112, the metadata storage 114, the content analyzer 116, the encoder and packager 118, and/or the measurement unit 122 can be on a different and distinct server. As such, the server 110 and/or the weakly connected device 140 in the exemplary content delivery system 100 can include more, less, and/or different elements than shown in FIG. 1. Each of the components in the content delivery system 100 can include appropriate hardware, software, and/or firmware to perform the operations attributed to the element herein. Operation(s) attributed to an element in the content delivery system 100 herein should not be considered binding and in some embodiments, other element(s) in the exemplary system 100 may additionally or alternatively perform such operation(s).

Figure 2:
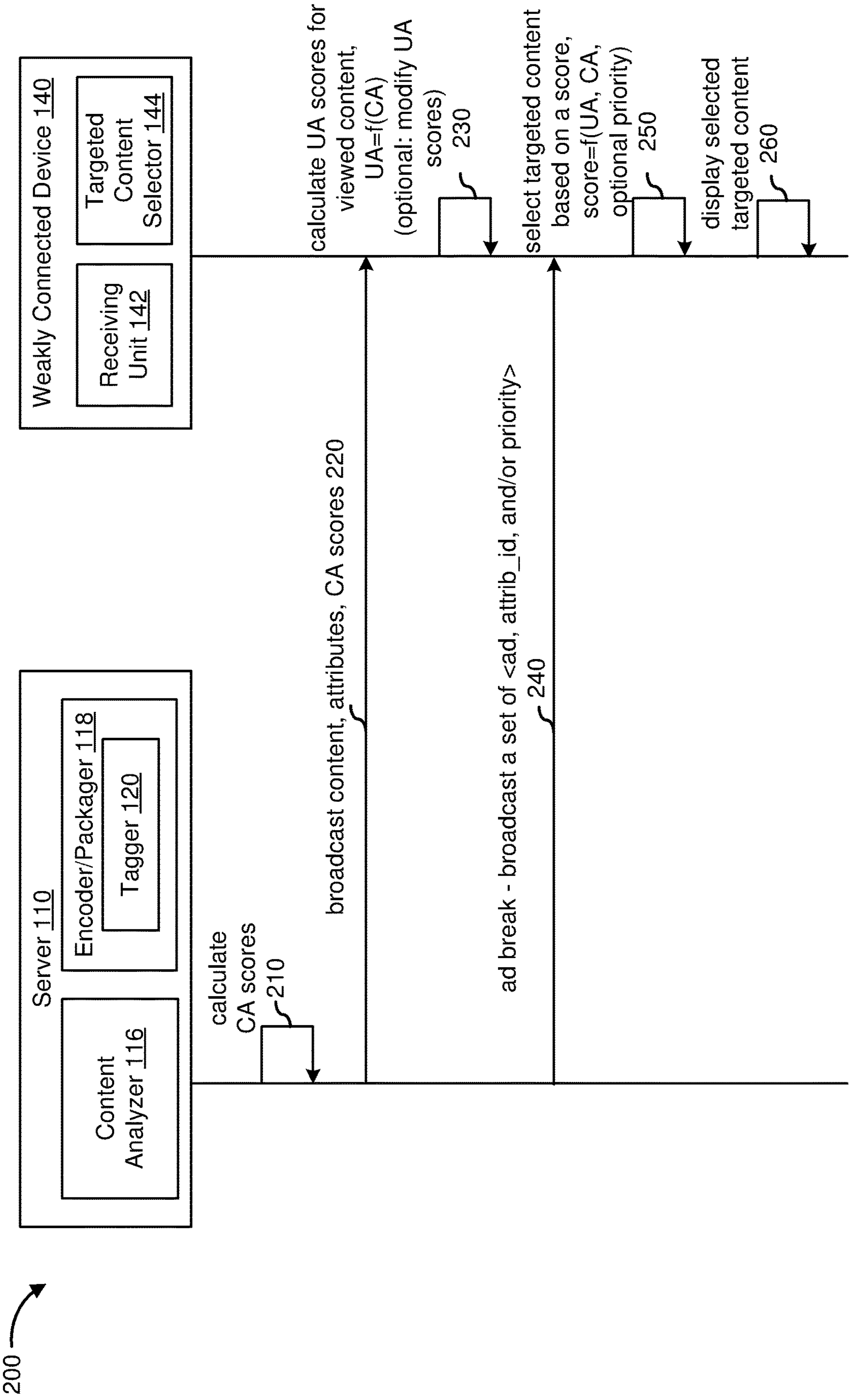
FIG. 2 is a sequence diagram illustrating using content attribute scores for targeted content selection, in accordance with some embodiments.
Figure 3B:
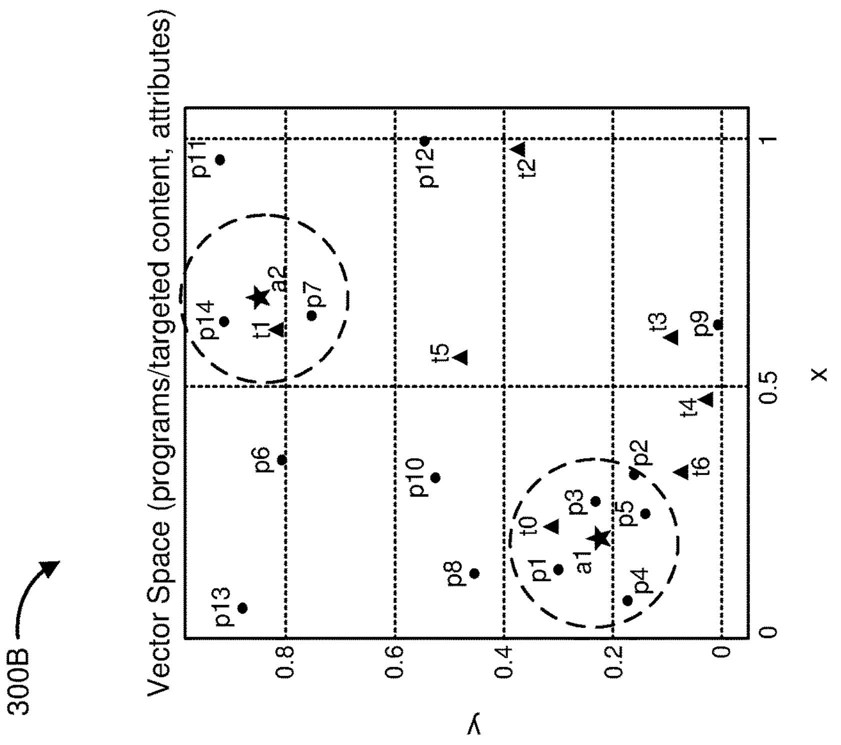
FIG. 3B is a diagram illustrating an exemplary vector space for determining content attribute scores, in accordance with some embodiments.
Figure 3A:
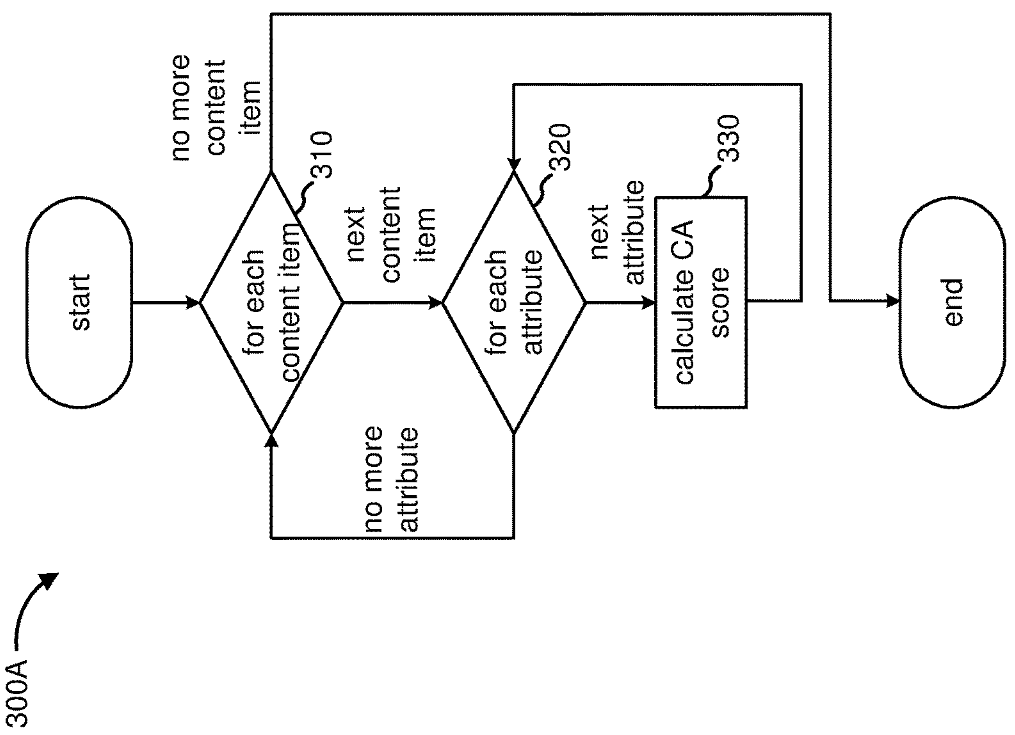
FIG. 3A is a flowchart illustrating an exemplary process for determining content attribute scores, in accordance with some embodiments.

FIG. 2 is a sequence diagram 200 illustrating using content attribute scores for targeted content selection at client devices in accordance with some embodiments. In step 210, an engine on the server 110, e.g., as part of the content analyzer 116, processes data related to media content, e.g., using a trained or learning model, to generate sets of feature vectors and uses the feature vectors to calculate content attribute scores representing similarities between media content and attributes. In some embodiments, the content attribute score is a numerical value. In some other embodiments, the content attribute score is a true/false value. FIGS. 3A and 3B illustrates exemplary content attribute score calculations in accordance with various embodiments.

Having determined the content attribute scores, in some embodiments, the server 110 (e.g., the tagger 120 within the encoder and packager 118) tags the media content items with the attributes and the content attribute scores before broadcasting the tagged media content items to the weakly connected device 140 in step 220. In some embodiments, the tagger adds relevant attributes (e.g., selected when the content attribute score associated with the attribute is above a threshold) and the corresponding content attribute scores to the metadata to be broadcasted with the media content, e.g., broadcasted along with each of the media content item or as a table for the media content item. For example, according to the digital video broadcasting (DVB) in the digital video broadcasting-service information (DVB-SI) standard, tables such as program association tables (PATs), program map tables (PMTs), event information tables (EITs), service description tables (SDTs), and/or network information tables (NITs) can be used to facilitate the broadcast of the attributes and/or content attribute scores.

On the receiving end, the weakly connected device 140, e.g., the receiving unit 142, receives the broadcasted data, extracts the media content for display and obtains the associated attributes and the content attribute scores from the broadcasted data. In step 230, the weakly connected device 140 includes a client engine, e.g., the targeted content selector 144, that tracks the viewing history of the client at the weakly connected device 140 and calculates user attribute (UA) scores for the attributes based on the actual views by the client. In some embodiments, the user attribute scores are numerical values. In some other embodiments, the user attribute scores are tolerance values, e.g., with a value or without a value. For example, a user attribute score for "travel" can be a numerical value between 1-100 or an indication of the user having interest in "travel", e.g., setting "Yes" as the score. Various embodiments of the calculation of the user attribute scores are described in further detail below with reference to FIG. 4.

In some embodiment, as part of step 230, the weakly connected device 140 enables the modification of the user attribute values at the weakly connected device 140. For example, the weakly connected device 140 can provide a list of attributes for the client to select from. In case of the client feeling that the server-provided scores do not reflect the real area-of-interest, the weakly connected device 140 receives a user input indicating the client interest. For example, the client can select an attribute corresponding to "travel" from a list of attributes. Upon receiving the user input, the user attribute value for the attribute "travel" can be updated or set to reflect the client interest. In some embodiments, the capability of modifying the user attribute value is enabled when the weakly connected device 140 share the selection data back to the server 110, e.g., via the reporting device 160 (FIG. 1) scanning a QR code representing the updated user attribute value.

Still referring to FIG. 2, on an advertisement break, in step 240, the server 110 transmits a list of targeted content items, e.g., broadcasted by the server 110 and optionally via the CDN 130 as shown in FIG. 1. In some embodiments, the transmission of the list of targeted content items in step 240 happens before the actual advertisement break so that multiple items can be transmitted ahead of the advertisement break and the client selects and downloads the relevant one(s) for play during the actual advertisement break. In such embodiments, an actual advertisement break indicator is sent after step 250 to trigger the display of the selected targeted content item(s). As such, when the weakly connected device 140 has the capacity to download and cache content, the weakly connected device 140 can obtain the list of targeted content items ahead of time to get ready for an advertisement break. On the other hand, in the case of the weakly connected device 140 does not have the capacity to download and cache content, step 240 is performed at the actual advertisement break, e.g., tuning the weakly connected device 140 to the advertisements.

In some embodiments, along with the targeted content items (or in a separate table as described above with reference to step 220), the server 110 also sends the attribute identifiers and optionally a priority score (PS) for each targeted content item. In some embodiments, the server 110 (e.g., the content analyzer 116, FIG. 1) sets the priority scores based on various parameters, such as the remaining goal of the number of impressions, the proportion of different segments in the population (e.g., estimated using the panel data 123 in FIG. 1), etc. For simplicity, in some embodiments, items in the list of targeted items have the same priority score.

In step 250, the weakly connected device 140 (e.g., the targeted content selector 144, FIG. 1) locates the attributes according to the attribute identifiers and calculates the list of targeted content items the user attribute values, and optionally includes the priority scores in the calculation of a score for each targeted content item. Based on the scores for the targeted content item, the targeted content selector 144 selects a targeted content item so that the selected targeted content item is displayed in step 260. Various embodiments of the calculation of the score for each targeted content item will be described in further detail below with reference to FIG. 4.

Following the sequence shown in FIG. 2, when new attributes that are different from existing attributes are added to the system, e.g., when a new advertiser targets users who are interested in "fitness" or when a new advertisement associated with "pet care" is aired, the system can retroactively associate the attributes to a client based on the viewing history. In some embodiments, when new keywords and/or area-of-interests are added as attributes, the server 110 re-calculates the content attribute scores in step 210 and transmits an updated table to the weakly connected device 140 in step 220, e.g., a table having content identifiers, the newly added attributes, and the updated content attribute scores. Upon receiving the updated content attribute scores, the weakly connected device 140 updates the user attribute scores based on viewed content corresponding to the content identifiers and the new attribute value in step 230. Such process enables the weakly connected device 140 to re-calculate similarities based on past views and apply the new attributes to targeted content for relevant users.

In some embodiments, instead of re-calculating for each content, the server 110 re-calculates the content attribute scores for content prepared for future events and for content from a period in the past and transmits the updated content attribute scores along with the content identifier and the newly added attributes. For example, when new attributes such as "fitness" and "pet care" are added to the system, the content analyzer 116 re-calculates the content attribute scores for future events and for each content broadcasted last day or week in step 220. On the client side, the targeted content selector 144 calculates the user attribute scores based on past views at the weakly connected device 140 and applies the new attributes to the targeted content in step 250.

As shown in FIG. 2, the system described herein can be used to select the downloads of targeted content to the weakly connected device 140 (e.g., a client device with limited connectivity). Moreover, the system described herein can be used to select not only targeted content such as advertisements, but also to select any content that is downloaded to the weakly connected device 140 (or any client device), e.g., the selection of to-go-streaming content and/or pay-per-view content, etc. For example, the attributes and content attribute scores can be associated with the to-go-streaming content and/or pay-per-view content, so that based on the local profile of viewed content and the content attribute scores, content can be selected following the steps 210-260. As such, the same methods, devices, and systems described herein can be used for alternative use cases when there is a benefit of deciding what content to download to the client devices.

FIG. 3A is a flowchart illustrating a process 300A for determining content attribute scores in accordance with some embodiments. In some embodiments, the process 300A is performed by the content analyzer 116 as shown in step 210 of FIG. 2. The process 300A begins with the content analyzer processing each content item in step 310. In some embodiments, the content items processed by the content analyzer include both the media content items, such as TV programs, and targeted content items, such as advertisements. In some embodiments, the feature vectors are generated based on the metadata (e.g., the metadata from the metadata storage 114, FIG. 1) related to the media content and/or pictures of the media content, such as synopsis from the metadata storage 114 (FIG. 1), and/or images from the content storage 112 (FIG. 1). For example, the content analyzer can not only use descriptions associated with the media content, but also additional data from sources such as content recognition of videos, audio, subtitles, posters, film databases, online knowledge base, etc. for feature vector extraction.

In step 320, for each content item, the content analyzer further processes each attribute in order to calculate the content attribute score representing the similarity between a respective content item and a respective attribute in step 330. The process 300A ends upon processing each content item and each attribute. As described above with reference to FIG. 2, in the case of receiving new attributes, steps 320 and 330 are repeated for a subset of content items in accordance with some embodiments, e.g., for media content items prepared for future events and for media content items broadcasted in the past within a threshold amount of time.

In some embodiments, the content analyzer uses a natural language processing (NLP) model to facilitate similarity determination. In such embodiments, an attribute can be a phrase that describes a segment of the targeted audience, e.g., "young pet owner". As such, a media content item can have similar content attribute values for multiple attributes, e.g., a media content item having similar content attribute values for attributes such as "young" and "pet owner". In such embodiments, a first media content item related to "young" attribute is relevant to the segment of the targeted audience; so is a second media content item related to "pet owner" attribute; and even more so is a third media content item related to both "young" and "pet owner" attributes. In another example, a movie having scenes showing restaurants at multiple international locations can have one content attribute score associated with an attribute "travel" that is similar to another content attribute score associated with an attribute "dining". Alternatively, a new combined attribute "travel AND restaurant" can be defined and provided to the NLP model for content attribute score calculation.

In some embodiments, to identify the similarity, the content analyzer projects attributes as well as the content items onto a latent vector space based on characteristics of the content items from the metadata storage 114 (FIG. 1) and/or the content storage 112 and determines the similarities based on the distance between vectors representing the content items and the attributes. In some embodiments, the content analyzer assigns a low content attribute score representing the shorter distance, and in such embodiments, a content item is considered similar to an attribute when the content attribute score is less than a threshold. In some other embodiments, the content analyzer assigns a high content attribute score representing the shorter distance, and in such embodiments, a content item is considered similar to an attribute when the content attribute score is greater than a threshold.

FIG. 3B illustrates an exemplary vector space 300B for determining content attribute scores. In some embodiments, when processing the content items, the content analyzer ingests from multiple sources, e.g., including not only tags and/or keywords associated with media content, but also additional data from sources such as content recognition of videos, audio, subtitles, posters, film databases, online knowledge base, etc. Moreover, in some embodiments, the content analyzer uses a trained model and/or a learning model (e.g., an enhanced NLP model) to learn from actual searches and views to further improve the accuracy of content attribute scores. Using the trained and/or learning model, in some embodiments, the content analyzer 116 obtains feature vectors as outputs and projects the feature vectors representing the content items and the attributes onto the latent vector space shown in FIG. 3B.

In FIG. 3B, dots representing feature vectors extracted from media content items such as TV programs are labeled as p1 through p14. Further, triangles representing feature vectors extracted from or associated with targeted content items, e.g., labeling advertisements as t0 through t5. Additionally, stars representing attributes are labeled as a1 and a2. In some embodiments, the advertisers mark each advertisement with the desired attributes, e.g., associating a targeted content item with a set of attributes, and the content analyzer 116 processes the media content items and the targeted content items for the set of attributes to set the content attribute scores for the media content items and the targeted content items. In some other embodiments, instead of the advertisers marking the desired attributes, the targeted content items are processed to extract relevant attributes.

In the exemplary latent vector space, media content items p1, p2, p3, p4, and p5 and the targeted content item t0 are close in distance, e.g., each within a threshold distance from another, indicating these content items are likely to have similar content, e.g., p1 through p5 corresponding to multiple sports events and t0 corresponding to a sports equipment advertisement. Further, the attribute a1 is close in distance with media content items p1, p2, p3, p4, and p5 and the targeted content item t0, e.g., p1, p2, p3, p4, p5, and t0 within a threshold distance from a1, e.g., a1 representing an attribute "sports". As such, by analyzing the latency vector space, the content analyzer obtains content attribute scores by measuring the distance between a data point representing a respective content item and another data point representing a respective attribute.

Figure 4:
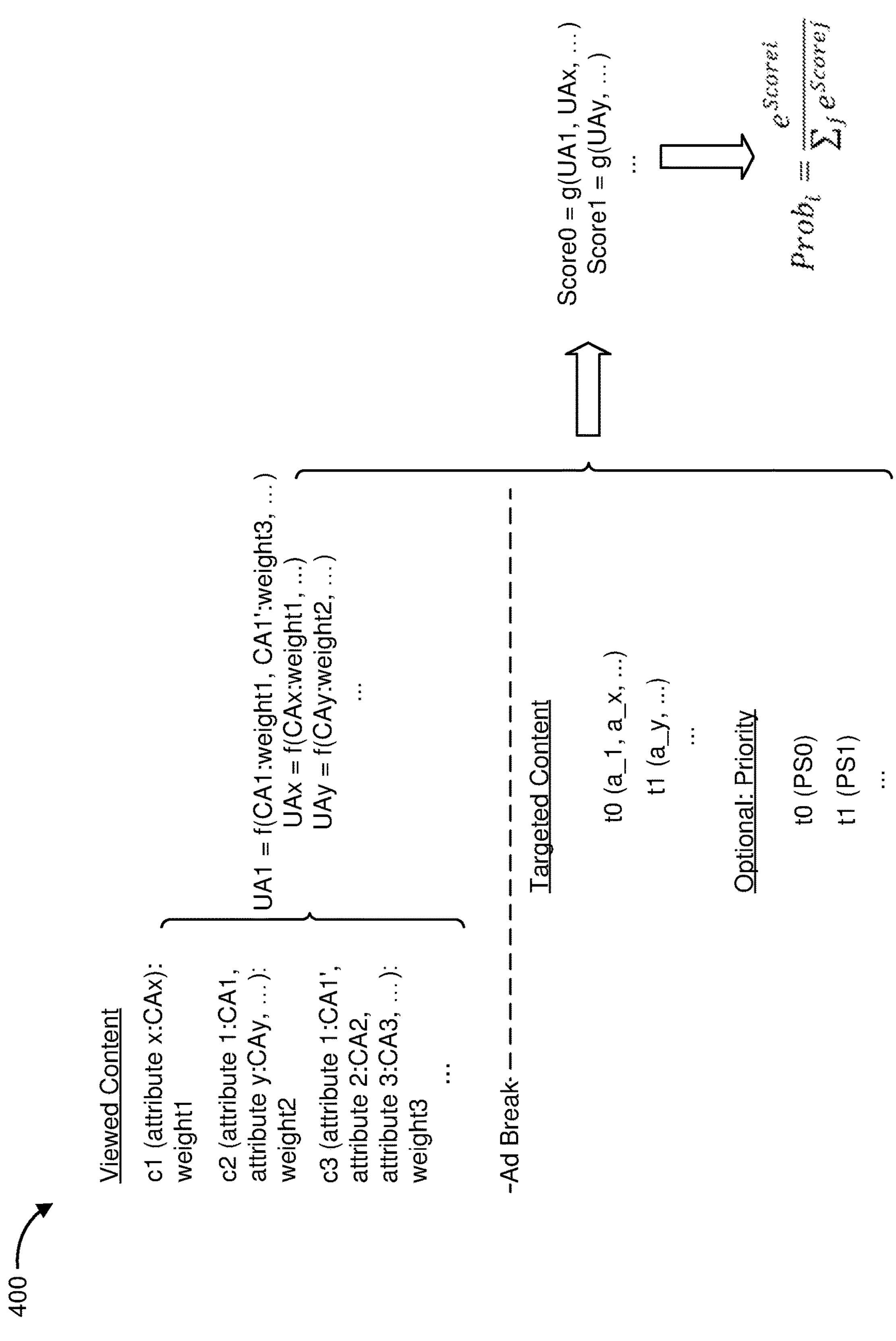
FIG. 4 is a diagram illustrating utilizing content attribute scores for selecting targeted content, in accordance with some embodiments.

FIG. 4 is a diagram 400 illustrating utilizing content attribute scores for selecting targeted content in accordance with some embodiments. As described above with reference to FIG. 2, in step 220, the server 110 broadcasts tagged content to the weakly connected device 140 and in step 230, the weakly connected device 140 (e.g., the targeted content selector 144, FIG. 2) calculates user attribute scores for viewed content based on the content attribute scores. In some embodiments, the weakly connected device 140 also includes other parameters in the calculation of the user attribute scores, and such parameters along with the values of such parameters can be fixed or configurable via the broadcasted data. For example, the server can configure the expiration and/or availability of certain attributes and/or content.

In FIG. 4, among the broadcasted items, the weakly connected device tracks viewed content items, such as c1, c2, and c3, etc., where each of the viewed content items is tagged with relevant attributes and corresponding content attribute scores by the server. For example, c1 is tagged with attribute x and the corresponding content attribute score x indicating the similarity between attribute x and c1; c2 is tagged with attribute 1 and the corresponding content attribute score CA1 as well as tagged with attribute y and the corresponding content attribute score CAy; and c3 is tagged with attributes 1 through 3 and the corresponding content attribute scores CA1', CA2, and CA3, respectively. The viewed content items shown in FIG. 4, e.g., c1, c2, and c3, can be TV programs and optionally targeted content items. For example, in a system offering features such as "skip" to skip viewing certain targeted content items, analyzing the behaviors of which and/or when a targeted content items by tracking the viewed targeted content items provides information about the similarities between the viewed targeted content items and the attributes.

In some embodiments, the targeted content selector aggregates the content attribute scores for each viewed content and obtains a user attribute score for each attribute based at least in part on the aggregated content attribute scores. For example, aggregating the viewed content items c1 and c3, the targeted content selector obtains a user attribute score for attribute 1 based at least in part on the user attribute scores CA1 and CA1', e.g., obtaining UA1 by applying a function to CA1 and CA1', etc. In another example, the targeted content selector identifies attribute x as being associated with content item c1 and obtains a user attribute score for attribute x based at least in part on the user attribute score CAx, e.g., obtaining UAx by applying a function to CAx, etc. In yet another example, the targeted content selector identifies attribute y being associated with content item c2 and obtains a user attribute score for attribute y based at least in part on the user attribute score CAy, e.g., obtaining UAy by applying a function to CAy, etc. In some embodiments, the user attribute score for an attribute is a weighted average of the content attribute scores associated with the attribute from the viewed content, e.g., setting or assigning a higher weight for recent content. In some embodiments, the weights used in the user attribute score calculation are determined by the viewing duration of the content, e.g., setting a higher weight value for content watched for a longer duration. As shown in FIG. 4, when calculating user attribute scores UA1, UAx, and UAy, the targeted content selector also uses weight1, weight2, and weight 3 associated with the viewed content c1, c2, and c3, respectively, as parameters along with the content attribute scores.

As described with reference to FIG. 2, in step 240, on or prior to an advertisement break, the server 110 broadcasts a set of targeted content items and each is tagged with attribute identifiers that correspond to relevant attributes of the targeted content items. For example, in FIG. 4, on an advertisement break, the server broadcasts a list of targeted content items t0, t1, etc., and each of the broadcasted targeted content items is tagged with relevant attribute identifiers. For example, a targeted content item t0 is tagged with identifier a_1 corresponding to attribute 1 and identifier a_x corresponding to attribute x. In another example, a targeted content item t1 is tagged with identifier a_y corresponding to attribute y.

Upon receiving the set of targeted content items and the attributes, in some embodiments, the targeted content selector locates the user attribute scores for the attributes, e.g., locating UA1, UAx, and UAy, and calculates a score for each targeted content item. For example, because the targeted content item t0 is tagged with a_1 and a_x, which correspond to attribute 1 and attribute x, respectively, the targeted content selector calculates for the targeted content item t0 a score Score0 by applying a function to UA1 and UAx, which are user attribute scores for attribute 1 and attribute x, respectively. In another example, because the targeted content item t1 is tagged with a_y, which corresponds to attribute y, the targeted content selector calculates for the targeted content item t1 a score Score1 by applying a function to UAy, which is the user attribute score for attribute y.

In some embodiments, the targeted content selector further transforms the scores calculated for each targeted content item to a distribution and chooses one targeted content item for display based on the probabilities. For example, to transform Score0, Score1, . . . to a distribution, the targeted content selector can apply the following Softmax function to the scores to generate a list of probabilities that sum to 1.

$$Prob_i = \frac{e^{Scorei}}{\sum_j e^{Scorej}}$$

In some embodiments, when transforming the scores to probabilities, instead of applying a Softmax function, the targeted content selector normalizes the scores. For example, the targeted content selector can apply the following function to normalize the scores.

$$\text{score} = \text{score} - \frac{\min(\text{scores})}{\max(\text{scores}) - \min(\text{scores})}$$

In some embodiments, to select the targeted content item, the targeted content selector selects the targeted content item with the highest score for display. In some other embodiments, the targeted content selector chooses the targeted content item using a weighted sampling method based on the calculated probabilities, e.g., when the scores have been transformed to probabilities.

In some embodiments, priority scores are also used for determining the most relevant targeted content item for display. In some embodiments, the server transmits priority scores when sending the set of targeted content items, e.g., tagging priority score PS0 for the targeted content item t0 and tagging priority score PSI for the targeted content item t1, etc., and the weakly connected device uses the priority scores in conjunction with the calculated probabilities (e.g., when using the weighted sampling method) or the highest score to determine the most relevant targeted content item for display. Using the weighted sampling method, the server can configure a high priority score for a valuable advertisement to increase the chances of the valuable advertisement being displayed at weakly connected devices. The priority scores thus enable the operator to signal the importance of targeted content items.

Figure 5:
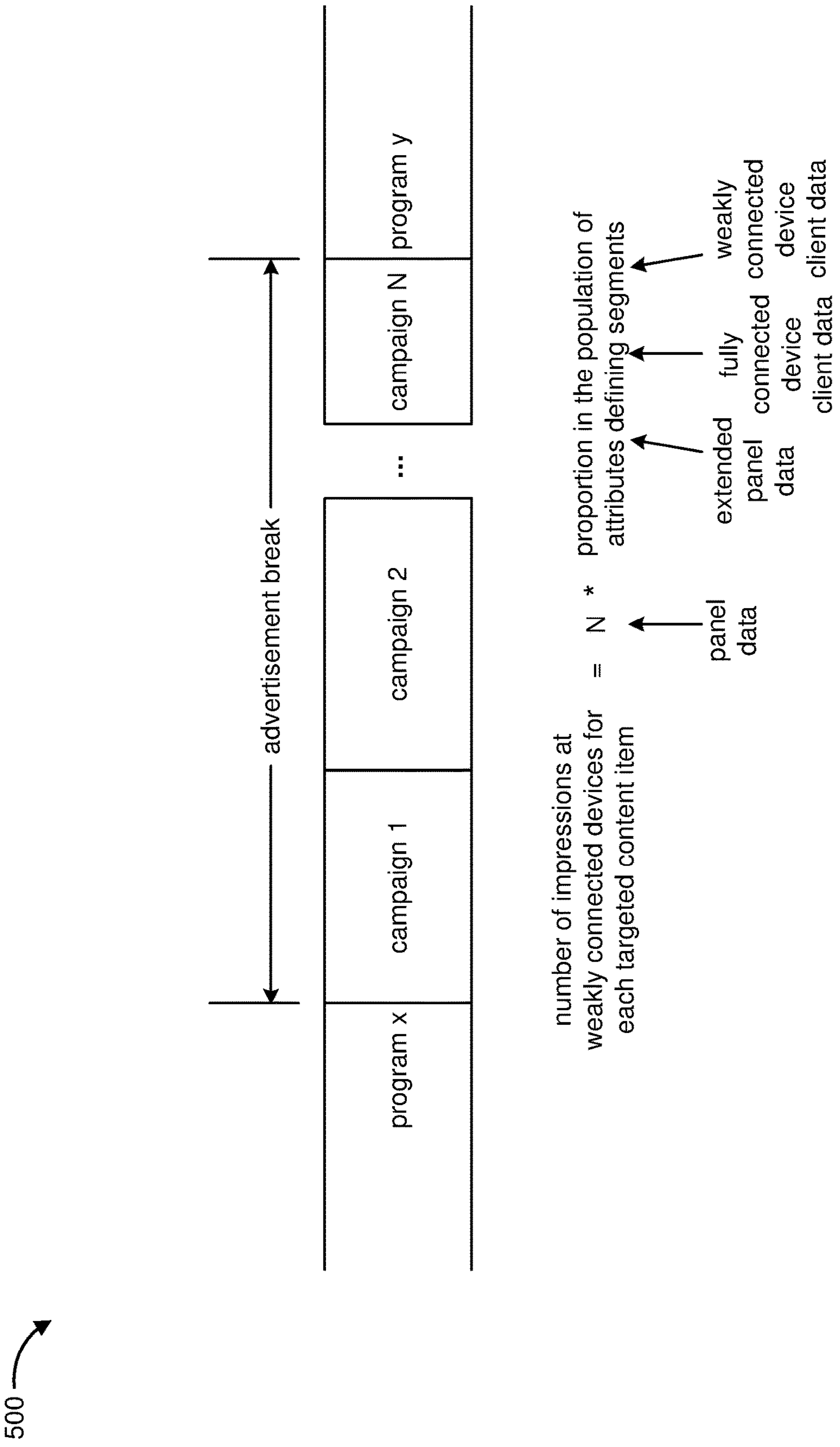
FIG. 5 is a diagram illustrating measuring the number of impressions, in accordance with some embodiments.

FIG. 5 is a diagram 500 illustrating measuring the number of impressions in accordance with some embodiments. In a dynamic advertisement system, it is necessary to estimate the number of impressions (e.g., actual views) for each advertisement with relevant attributes. Since the user attribute scores are calculated by weakly connected devices in the system described herein, in some embodiments, the measurement unit on the server side, e.g., the measurement unit 122, mimics the logic of client devices and uses available data (such as the panel data 123 in FIG. 1) to predict and/or report the estimated number of times targeted content has been viewed.

Currently, panel data provides the number of views at any given time (e.g., how many people watch a specific show). To determine the population distribution of values for dynamic attributes, as shown in FIG. 5, in some embodiments, the measurement unit measures the number of impressions of an advertisement break by first obtaining the number of viewers (denoted as N) during the advertisement break from the national panel data. Further, in some embodiments, the measurement unit obtains the proportion in the population of attributes that define user segments. The measurement unit can then multiply the number of viewers with the proportion to derive the number of impressions at weakly connected devices for each targeted content item.

In some embodiments, the proportion can be obtained by extending the national panel data. For example, the panel data provide information about the content actually viewed by certain users. Cross referencing the panel data and using the information from the users, the content, and the attributes, the measurement unit can generate the population numbers for each attribute, e.g., cross referencing the panel data with the similarities between content and attributes, time of events being broadcasted, time of campaigns being broadcasted, time of TV programs, etc.

For example, the panel data reflect viewing data associated with approximately 1000 users. For each channel at a given time, the panel data represent how many of these 1000 users watched the respective channel. For instance, in the case of the number being 200, e.g., 200 users of these 1000 users watched a particular channel at a given time, one can calculate the estimated number of viewers in the population of 100000 by calculating 100000*(200/1000). Since the panel data also include information about the 1000 users from the measurement, e.g., the panel data include the actual shows each viewer watched, to expand the panel data in some embodiments, the measurement unit performs the same calculation as the client devices to mimic the client devices, e.g., calculating the user attribute scores for each of the users. For instance, assuming according to the calculation of the user attribute scores, 100 people among the 1000 users are associated with the attribute "travel", the measurement unit can report that the proportion of users who are interested in "travel" in the population is 10%, e.g., 100/1000. Moreover, for the 100 people that are interested in "travel", the measurement unit can simulate the targeted content selector on the client devices to determine which targeted content item each user is interested in watching. For example, assuming based on the simulation, 50 people among 1000 users are about to watch a particular advertisement, the measurement unit can report that there are approximately 5000 people in the general population of 100000 would watch the advertisement, e.g., (50/1000) *100000 people.

In some embodiments, the proportion can be obtained by using the client data from fully connected devices to reflect the statistical data for the general population. For example, the server can train models using client data from the fully connected devices and the models can be used to analyze and/or classify the weakly connected devices to derive the statistical data of impressions at the weakly connected devices, e.g., classifying based on profiles, capacities, configurations, and/or activities of the weakly connected devices, and/or profiles of the users at the weakly connected devices.

In some other embodiments, using a report back system or device as shown in FIG. 1, the client data from at least some of the weakly connected devices can be uploaded to the server, e.g., using an AMS system or by scanning a QR code representing the user attribute scores. For example, the targeted content selector 144 (FIGS. 1 and 2) can facilitate locating one or more user attribute scores used for generating a score for the targeted content item, and the weakly connected device then reports to the server, e.g., via an independent source coupled with the weakly connected device, the one or more user attribute scores, e.g., via the independent score scanning a QR code representing the one or more user attribute scores and sending the QR code to the server.

Figure 6:
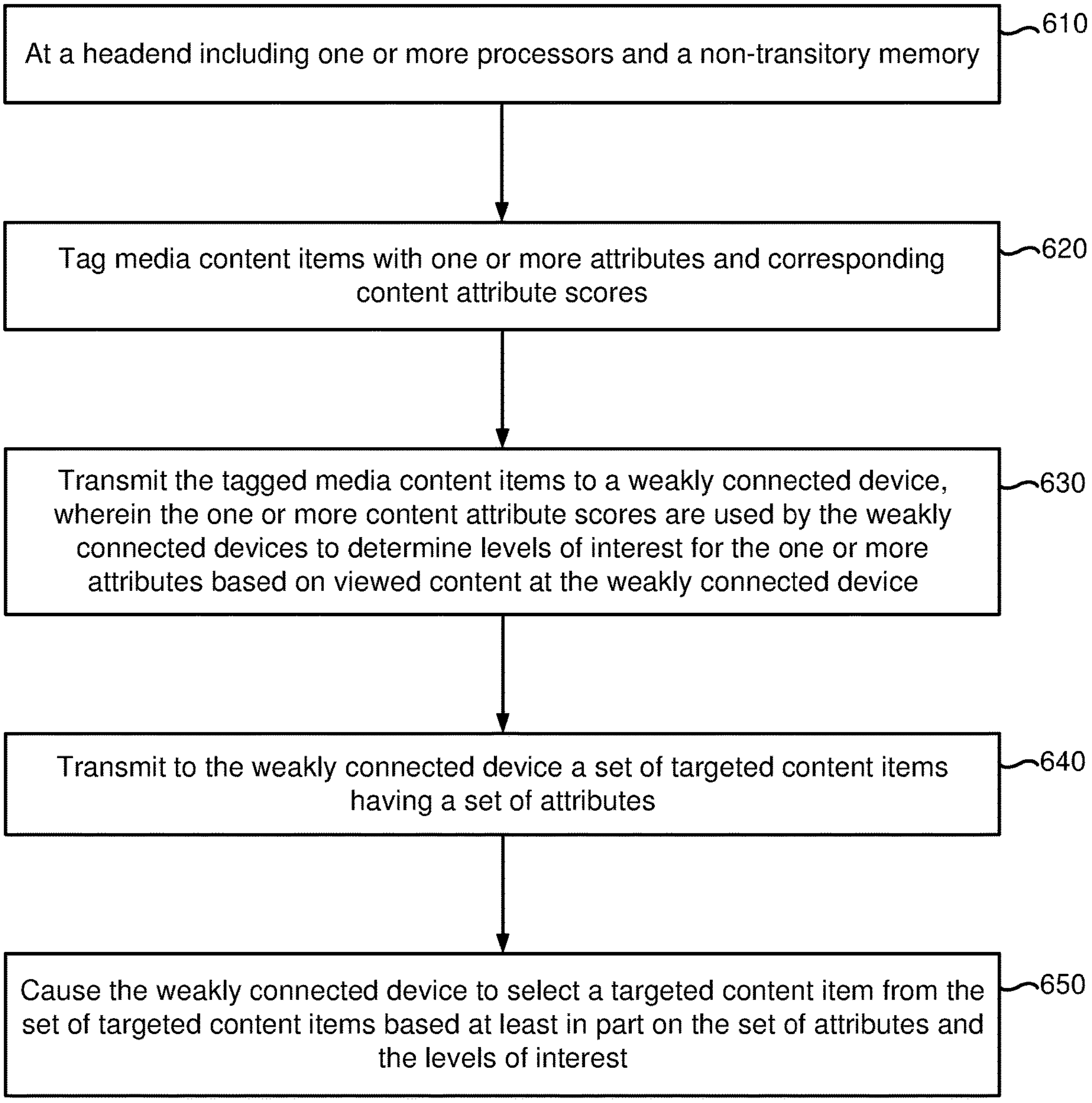
FIG. 6 is a flowchart illustrating a method of tagging content to enable targeted content selection at weakly connected devices, in accordance with some embodiments.

FIG. 6 is a flowchart illustrating a method 600 of tagging content to enable targeted content selection at weakly connected devices in accordance with some embodiments. In some embodiments, as represented by block 610, the method 600 is performed at a headend, e.g., the server 110 in FIGS. 1 and 2, which includes one or more processors and a non-transitory memory. The method 600 begins with the server tagging media content items (e.g., TV programs) with one or more attributes (e.g., travel, cooking, etc.) and corresponding content attribute scores (e.g., scores or true/false), as represented by block 620. The method 600 continues, as represented by block 630, with the server transmitting (e.g., broadcasting) the tagged media content items to a weakly connected device (e.g., one of the weakly connected devices 140 in FIGS. 1 and 2), where the one or more content attribute scores are used by the weakly connected devices to determine levels of interest for the one or more attributes based on viewed content at the weakly connected device. The server then transmits (e.g., on an advertisement break or prior to an advertisement break such as downloading at night or during off peak hours) to the weakly connected device a set of targeted content items (e.g., optional advertisements) having a set of attributes (e.g., each targeted content item tagged with attribute ID(s)), as represented by block 640, and the transmission of the set of targeted content items causes the weakly connected device to select a targeted content item from the set of targeted content items based at least in part on the set of attributes and the levels of interest, as represented by block 650, e.g., at a given time such as upon an advertisement break.

Figure 7:
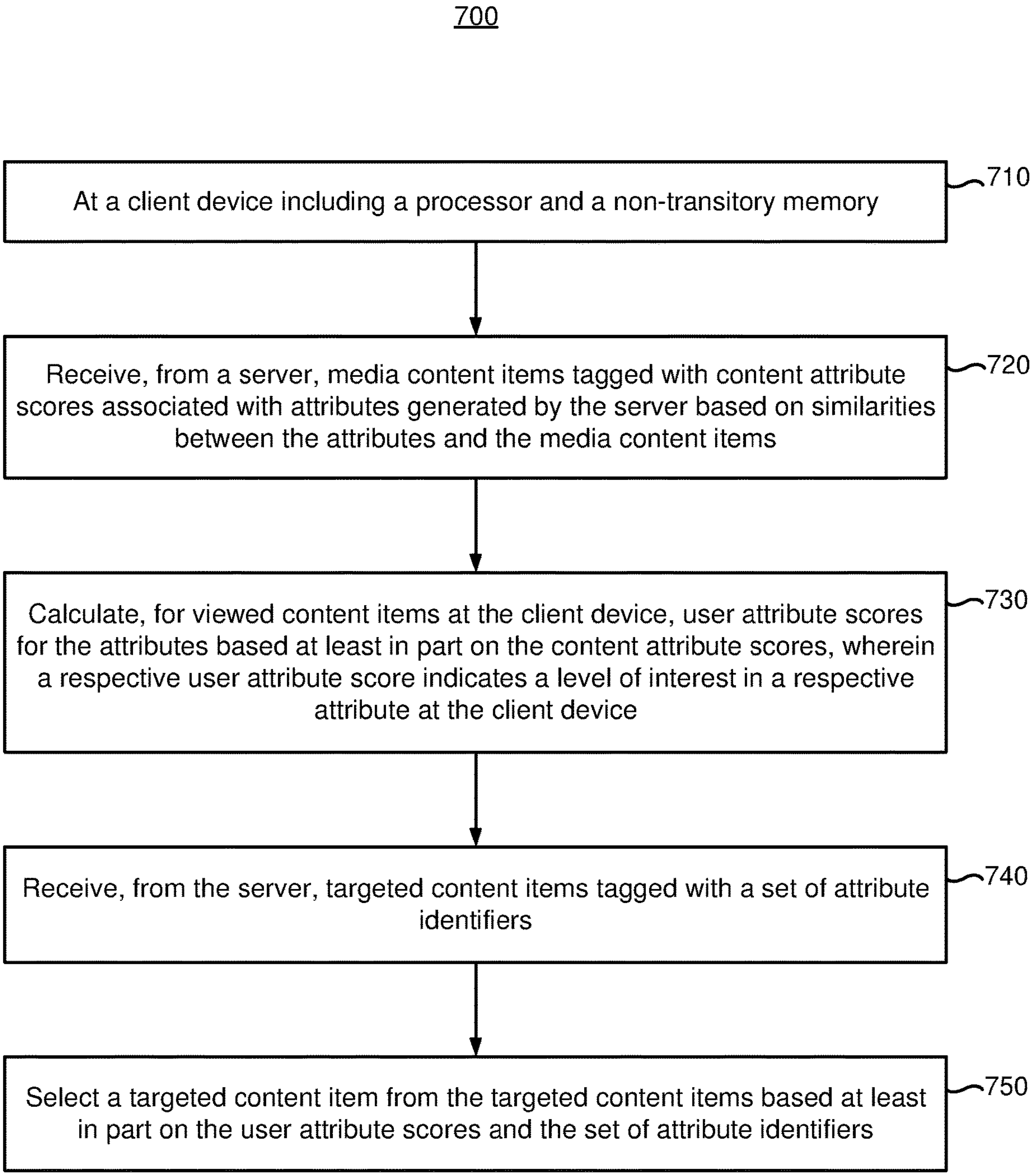
FIG. 7 is a flowchart illustrating a method of using content attribute scores for targeted content selection at weakly connected devices, in accordance with some embodiments.

FIG. 7 is a flowchart illustrating a method 700 of using content attribute scores for targeted content selection at weakly connected devices in accordance with some embodiments. In some embodiments, as represented by block 710, the method 700 is performed at a client device, e.g., the weakly connected device 140 in FIGS. 1 and 2, which includes a processor and a non-transitory memory. The method 700 begins, as represented by block 720, with the weakly connected device receiving, from a server (e.g., the server 110 in FIGS. 1 and 2), media content items tagged with content attribute scores associated with attributes generated by the server based on similarities between the attributes and the media content items. For example, the attributes and the content attribute scores for each content item are inserted into the broadcast stream along with the content item or as part of a table. The method 700 continues, as represented by block 730, with the client device calculating, for viewed content items at the client device, user attribute scores for the attributes based at least in part on the content attribute scores, where a respective user attribute score indicates a level of interest in a respective attribute at the client device. Once the client device receives, from the server, targeted content items tagged with a set of attribute identifiers, as represented by block 740, the client device selects a targeted content item from the targeted content items based at least in part on the user attribute scores and the set of attribute identifiers, as represented by block 750.

Figure 8:
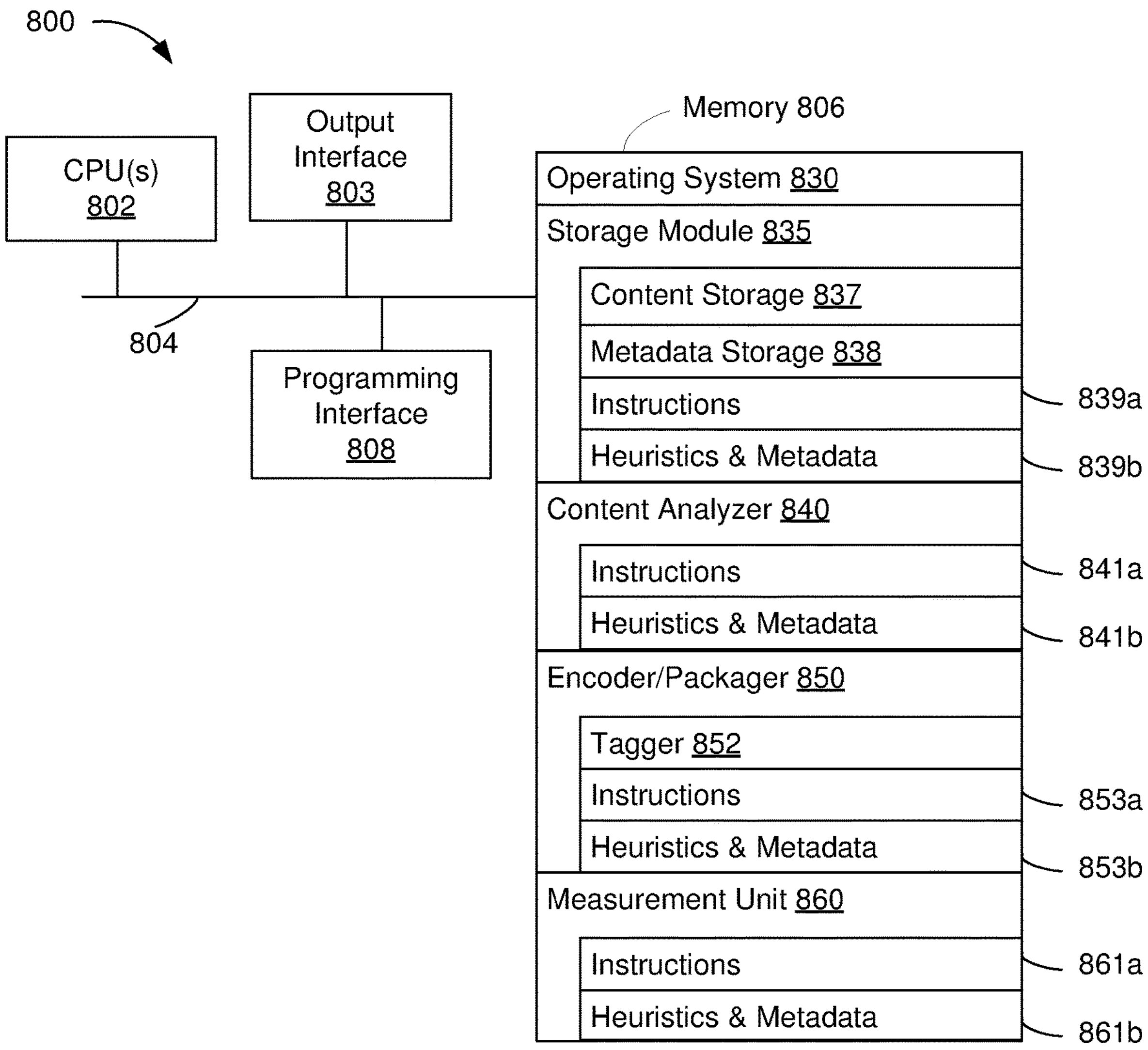
FIG. 8 is a block diagram illustrating a computing device for preparing and measuring the viewing of targeted content for weakly connected devices.

FIG. 8 is a block diagram of a computing device 800 for preparing and measuring the viewing of targeted content for weakly connected devices in accordance with some embodiments. In some embodiments, the computing device 800 corresponds to the server 110 in FIG. 1 and performs one or more of the functionalities described above with respect to the server 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803 (e.g., a network interface), a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830, a storage module 835, a content analyzer 840, an encoder and packager unit 850, and a measurement unit 860. In some embodiments, one or more instructions are included in a combination of logic and non-transitory memory. The operating system 830 includes procedures for handling various basic system services and for performing hardware dependent tasks.

In some embodiments, the storage module 835 is configured to store and/or manage a content storage 837 (e.g., the content storage 112, FIG. 1) and a metadata storage 838 (e.g., the metadata storage 114, FIG. 1). To that end, the storage module 835 includes a set of instructions 839*a* and heuristics and metadata 839*b*.

In some embodiments, the content analyzer 840 (e.g., the content analyzer 116, FIG. 1) is configured to analyze content from the content storage 837 and attributes from the metadata storage 838 as described above. To that end, the content analyzer 840 includes a set of instructions 841*a* and heuristics and metadata 841*b*.

In some embodiments, the encoder and packager unit 850 (e.g., the encoder and packager unit 118, FIG. 1) is configured to encode and/or package media content for delivery to client devices. In some embodiments, the encoder and packager unit 850 includes a tagger 852 (e.g., the tagger 120, FIG. 1) to tag content with attributes and/or content attribute scores as described above. To that end, the encoder and packager unit 850 includes a set of instructions 853*a* and heuristics and metadata 853*b*.

In some embodiments, the measurement unit 860 (e.g., the measurement unit 122, FIG. 1) is configured to measure the impressions at the client devices. To that end, the measurement unit 860 includes a set of instructions 861*a* and heuristics and metadata 861*b*.

Although the storage model 835, the content analyzer 840, the encoder and packager unit 850, and the measurement unit 860 are illustrated as residing on a single computing device 800, it should be understood that in other embodiments, any combination of the storage model 835, the content analyzer 840, the encoder and packager unit 850, and the measurement unit 860 can reside in separate computing devices in various embodiments. For example, in some embodiments, each of the storage model 835, the content analyzer 840, the encoder and packager unit 850, and the measurement unit 860 resides on a separate computing device.

Moreover, FIG. 8 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 9:
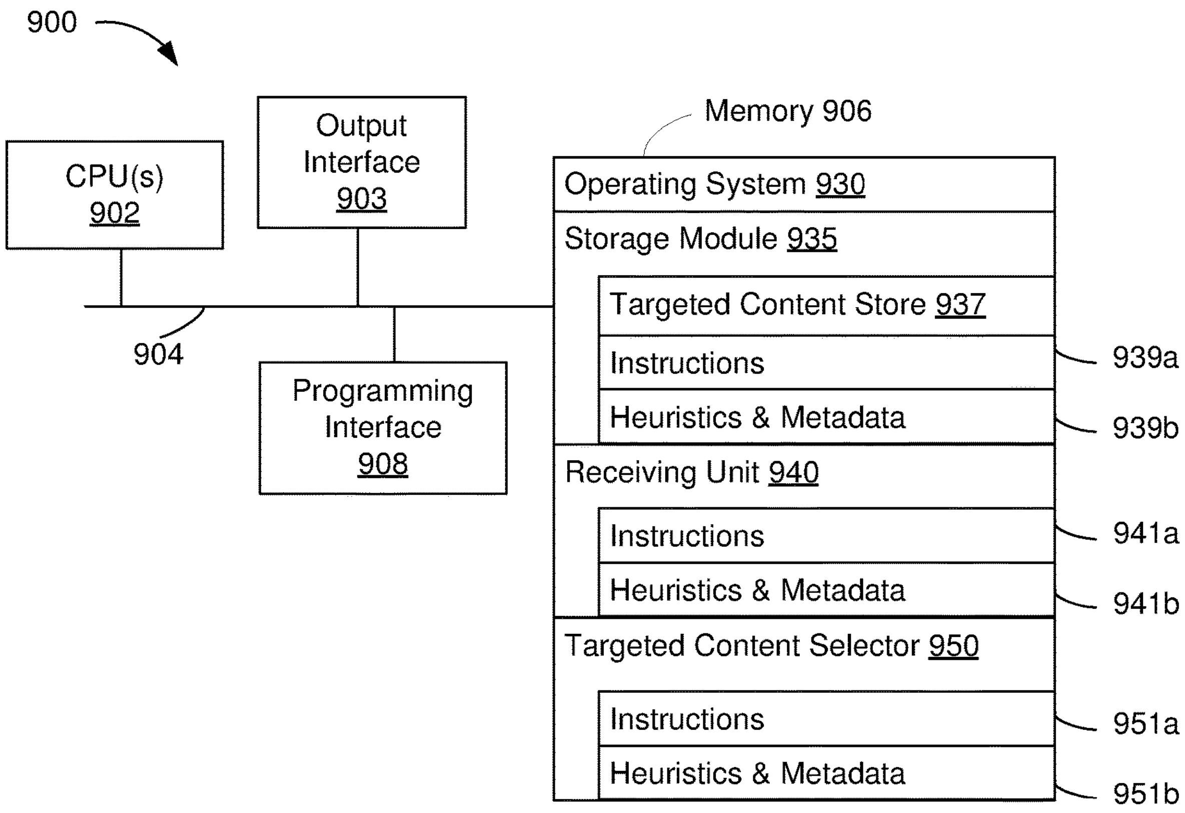
FIG. 9 is a block diagram illustrating another computing device for receiving and selecting targeted content for display, in accordance with some embodiments.

FIG. 9 is a block diagram of a computing device 800 for receiving and selecting targeted content for display in accordance with some embodiments. In some embodiments, the computing device 900 corresponds to a client device such as one of the fully connected device 150 or one of the weakly connected device 140 in FIG. 1 and performs one or more of the functionalities described above with respect to the client device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903 (e.g., a network interface), a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930, a storage module 935, a receiving unit 940, and a targeted content selector 950. In some embodiments, one or more instructions are included in a combination of logic and non-transitory memory. The operating system 930 includes procedures for handling various basic system services and for performing hardware dependent tasks.

In some embodiments, the storage module 935 is configured to store and/or manage a targeted content store 937 (e.g., the targeted content store 146, FIG. 1). To that end, the storage module 935 includes a set of instructions 939*a* and heuristics and metadata 939*b*.

In some embodiments, the receiving unit 940 (e.g., the receiving unit 142, FIG. 1) is configured to receiving tagged media content from a server. To that end, the receiving unit 940 includes a set of instructions 941*a* and heuristics and metadata 941*b*.

In some embodiments, the targeted content selector 950 (e.g., the targeted content selector 144, FIG. 1) is configured to select targeted content based on the attributes received by the receiving unit and locally viewed content. To that end, the targeted content selector 950 includes a set of instructions 951*a* and heuristics and metadata 951*b*.

Although the storage model 935, the receiving unit 940, and the targeted content selector 950 are illustrated as residing on a single computing device 900, it should be understood that in other embodiments, any combination of the storage model 935, the receiving unit 940, and the targeted content selector 950 can reside in separate computing devices in various embodiments. For example, in some embodiments, each of the storage model 935, the receiving unit 940, and the targeted content selector 950 resides on a separate computing device.

Moreover, FIG. 9 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:

at a headend including one or more processors and a non-transitory memory:

obtaining content attribute scores of attributes associated with media content items, wherein the attributes describe segments of targeted audience, the content attribute scores are obtained by projecting the attributes and the media content items onto a vector space based on characteristics of the media content items, and assigning a respective content attribute score represents a similarity between a respective media content item and a respective attribute based on distances between vectors representing the media content items and the attributes in the vector space;

tagging the media content items with one or more attributes and one or more corresponding content attribute scores, including tagging a set of targeted content items with a set of attribute identifiers;

transmitting the tagged media content items to a weakly connected device, wherein the one or more content attribute scores are used by the weakly connected devices to determine user attribute scores indicating levels of interest for the one or more attributes based on viewed media content items at the weakly connected device; and causing the weakly connected device to locate a set of user attribute scores corresponding to the set of attribute identifiers and select a targeted content item from the set of targeted content items based at least in part on the set of user attribute scores.

2. The method of claim 1, wherein obtaining the content attribute scores of attributes associated with the media content items includes:

identifying the one or more attributes of the media content items; and utilizing a natural language processing (NLP) model to calculating for the media content items the content attribute scores.

3. The method of claim 1, further comprising: prior to performing the tagging, determining whether a media content item is in one or more predefined categories; and forgoing tagging a content attribute score for the media content item in accordance with determining that the media content item is in the one or more predefined categories.

4. The method of claim 1, further comprising:

adding an attribute different from the one or more attributes;

tagging a subset of the media content items with the attribute and a set of content attribute scores; and transmitting to the weakly connected device identifiers of the subset of the media content items, the attribute, and the set of content attribute scores.

5. The method of claim 1, further comprising:

setting a set of priority scores for the set of targeted content items;

transmitting to the weakly connected device the set of priority scores; and causing the weakly connected device to apply the set of priority scores to a set of scores calculated for the set of targeted content items when selecting the targeted content item from the set of targeted content items.

6. The method of claim 1, further comprising:

obtaining a number of viewers of the set of targeted content items;

estimating a proportion of population viewing a respective targeted content item in the set of targeted content items at a plurality of weakly connected devices, wherein the respective targeted content item is associated with one or more attributes, each defining a respective segment of targeted audience; and determining number of times the respective targeted content item being viewed by the respective segment of the targeted audience at the plurality of weakly connected devices based on the number of viewers and the proportion of population.

7. The method of claim 6, wherein estimating the proportion of population viewing the respective targeted content item in the set of targeted content items at the plurality of weakly connected devices includes:

obtaining panel data representing viewing of the respective targeted content item at a plurality of client devices; and deriving the proportion of population viewing the respective targeted content item at the plurality of weakly connected devices from the panel data.

8. The method of claim 6, wherein estimating the proportion of population viewing the respective targeted content item in the set of targeted content items at the plurality of weakly connected devices includes:

obtaining reporting of client data representing viewing the respective targeted content item at fully connected devices; and estimating the proportion of population viewing the respective targeted content item in the set of targeted content items at the plurality of weakly connected devices based at least in part on the client data.

9. The method of claim 6, wherein estimating the proportion of population viewing the respective targeted content item in the set of targeted content items at the plurality of weakly connected devices includes:

obtaining reporting of client data representing the level of interests from the weakly connected device via an independent source coupled with the weakly connected device; and deriving the proportion of population based at least in part on the client data.

10. A method comprising:

at a client device including a processor and a non-transitory memory:

receiving, from a server, media content items tagged with attributes describing segments of targeted audience and content attribute scores associated with the attributes, wherein the content attribute scores are obtained by the server by projecting the attributes and the media content items onto a vector space based on characteristics of the media content items and assigning the content attribute scores representing similarities between the attributes and the media content items based on distances between vectors representing the media content items and the attributes in the vector space, and wherein the media content items include targeted content items tagged with a set of attribute identifiers;

calculating, for viewed media content items at the client device, user attribute scores for the attributes based at least in part on the content attribute scores, wherein a respective user attribute score indicates a level of interest in a respective attribute at the client device;

locating a set of user attribute scores corresponding to the set of attribute identifiers; and selecting a targeted content item from the targeted content items based at least in part on the user attribute scores.

11. The method of claim 10, wherein calculating, for the viewed media content items at the client device, the user attribute scores for the attributes includes:

tracking the viewed media content items at the client device;

identifying, for the viewed media content items, corresponding attributes and associated content attribute scores; and calculating the user attribute scores for the corresponding attributes as a function of the associated content attribute scores.

12. The method of claim 10, wherein calculating, for the viewed media content items at the client device, the user attribute scores for the attributes includes:

receiving a user input indicating an interest in an attribute of the attributes; and setting a user attribute score corresponding to the attribute according to the user input.

13. The method of claim 10, wherein calculating, for the viewed media content items at the client device, the user attribute scores for the attributes includes:

setting weights to the viewed media content items based on timestamps of viewing the content items at the client devices; and applying the weights when calculating the user attribute scores for the attributes.

14. The method of claim 10, wherein selecting the targeted content item from the targeted content items based at least in part on the user attribute scores and the set of attribute identifiers includes:

identifying, according to the attribute identifiers, a set of user attribute scores; and applying a function to the set of user attribute scores to generate scores for the targeted content items; and selecting the targeted content item based at least in part on the scores.

15. The method of claim 10, wherein selecting the targeted content item from the targeted content items based at least in part on the user attribute scores and the set of attribute identifiers includes:

receiving priority scores associated with the targeted content items from the server, wherein a priority score for a respective targeted content item is set by the server indicating a value of importance of the respective targeted content item; and selecting the targeted content item from the targeted content items based on the user attribute scores and the priority scores.

16. The method of claim 10, further comprising:

receiving, from the server, an attribute, at least one content identifier, and at least one content attribute score, wherein the attribute is different from any of the attributes;

identifying at least one viewed content item corresponding to the at least one content identifier and at least one content attribute score for the at least one viewed content item; and calculating at least one user attribute score based at least in part on the at least one content attribute score.

17. The method of claim 10, further comprising:

locating one or more user attribute scores used for generating a score for the targeted content item; and reporting to the server, via an independent source coupled with the client device, the one or more user attribute scores.

18. A device comprising:

one or more processors;

a non-transitory memory; and one or more programs stored in the non-transitory memory, which, when executed by the one or more processors, cause the device to:

obtain content attribute scores of attributes associated with media content items, wherein the attributes describe segments of targeted audience, the content attribute scores are obtained by projecting the attributes and the media content items onto a vector space based on characteristics of the media content items, and assigning a respective content attribute score represents a similarity between a respective media content item and a respective attribute based on distances between vectors representing the media content items and the attributes in the vector space;

tag the media content items with one or more attributes and one or more corresponding content attribute scores, including tagging a set of targeted content items with a set of attribute identifiers;

transmit the tagged media content items to a weakly connected device, wherein the one or more content attribute scores are used by the weakly connected devices to determine user attribute scores indicating levels of interest for the one or more attributes based on viewed media content items at the weakly connected device; and cause the weakly connected device to locate a set of user attribute scores corresponding to the set of attribute identifiers and select a targeted content item from the set of targeted content items based at least in part on the set of user attribute scores.

19. The device of claim 18, wherein obtaining the content attribute scores of attributes associated with the media content items includes:

identifying the one or more attributes of the media content items; and utilizing a natural language processing (NLP) model to calculating for the media content items the content attribute scores.

20. The device of claim 18, wherein the one or more programs, which, when executed by the one or more processors, further cause the device to: prior to performing the tagging, determine whether a media content item is in one or more predefined categories; and forgo tagging a content attribute score for the media content item in accordance with determining that the media content item is in the one or more predefined categories.

* * * * *